(12) United States Patent
Pradas et al.

(10) Patent No.: US 10,375,599 B2
(45) Date of Patent: *Aug. 6, 2019

(54) METHODS AND APPARATUSES FOR USE IN A MOBILE COMMUNICATION NETWORK

(71) Applicant: Telefonaktiebolaget LM Ericsson (publ), Stockholm (SE)

(72) Inventors: Jose Luis Pradas, Stockholm (SE); Alessandro Caverni, Stockholm (SE); Nianshan Shi, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 149 days.

This patent is subject to a terminal disclaimer.

(21) Appl. No.: 15/422,144

(22) Filed: Feb. 1, 2017

(65) Prior Publication Data

US 2017/0150550 A1    May 25, 2017

Related U.S. Application Data

(63) Continuation of application No. 13/995,683, filed as application No. PCT/SE2013/050362 on Apr. 2, 2013, now Pat. No. 9,596,714.
(Continued)

(51) Int. Cl.
*H04W 28/02* (2009.01)
*H04W 72/04* (2009.01)
(Continued)

(52) U.S. Cl.
CPC ....... *H04W 28/0278* (2013.01); *H04W 72/04* (2013.01); *H04W 72/0433* (2013.01); *H04W 76/20* (2018.02); *H04W 76/38* (2018.02)

(58) Field of Classification Search
None
See application file for complete search history.

(56) References Cited

U.S. PATENT DOCUMENTS 7,756,087 B2    7/2010 Kim et al.
9,596,714 B2 *  3/2017 Pradas ............. H04W 72/0433
(Continued)

FOREIGN PATENT DOCUMENTS

CN    101911779 A    12/2010
CN    201733326 U    2/2011
(Continued)

OTHER PUBLICATIONS

Ericsson, et al., "Total E-DCH Buffer Size in Case of CCCH Transmission", 3GPP TSG-RAN WG2 #78; R2-122033; May 21-25, 2012. pp. 1-4. Prague, Czech Republic.
(Continued)

*Primary Examiner* — Noel R Beharry
*Assistant Examiner* — Rodrick Mak
(74) *Attorney, Agent, or Firm* — Murphy, Bilak & Homiller, PLLC

(57) ABSTRACT

The proposed technology relates to the issue of supporting release of common radio resources in a radio communication network. A radio network controller sends an indication of a value of a timer for implicit release of common radio resources to a base station. The base station receives the indication of a value of a timer for implicit release of common radio resources and determines whether to release common radio resources based on the indication of a value of the timer for implicit release of common radio resources. In this way, by using the indication of a value of the timer for implicit release the base station will be able to correctly determine whether to release the common resources upon reception of a report of empty buffer status from a UE. This will eliminate misinterpretations of the empty buffer status report, and avoid unnecessary radio link failures.

10 Claims, 9 Drawing Sheets

Related U.S. Application Data

(60) Provisional application No. 61/682,442, filed on Aug. 13, 2012.

(51) Int. Cl.
  *H04W 76/20* (2018.01)
  *H04W 76/38* (2018.01)

(56) References Cited

U.S. PATENT DOCUMENTS

| | | |
|---|---|---|
| 2005/0207359 A1 | 9/2005 | Hwang et al. |
| 2005/0251722 A1 | 11/2005 | Terry et al. |
| 2008/0227442 A1 | 9/2008 | Pani et al. |
| 2009/0086671 A1* | 4/2009 | Pelletier ............... H04W 72/12 370/329 |
| 2009/0116378 A1 | 5/2009 | Jen |
| 2009/0170441 A1 | 7/2009 | Eckert et al. |
| 2009/0185528 A1 | 7/2009 | Sambhwani et al. |
| 2011/0134774 A1 | 6/2011 | Pelletier et al. |
| 2015/0156761 A1 | 6/2015 | Christoffersson |

FOREIGN PATENT DOCUMENTS

| | | |
|---|---|---|
| JP | 2010541422 A | 12/2010 |
| JP | 2011511517 A | 4/2011 |
| RU | 2305371 C2 | 8/2007 |
| WO | 2006092769 A1 | 9/2006 |
| WO | 2009082329 A2 | 7/2009 |
| WO | 2010019364 A1 | 2/2010 |
| WO | 2010087590 A3 | 10/2010 |
| WO | 2011050525 A1 | 5/2011 |
| WO | 2012045486 A1 | 4/2012 |

OTHER PUBLICATIONS

Huawei, et al., "Introduction of Common E-DCH Implicit Release Timer", 3GPP TSG-RAN3 Meeting #78; R3-122434; Nov. 12-16, 2012. pp. 1-12. New Orleans, US.

3GPP, "3rd Generation Partnership Project; Technical Specification Group Radio Access Network; Medium Access Control (MAC) protocol specification (Release 8) 3GPP TS 25.321 V8.15.0,". Jun. 2012. pp. 1-189.

3GPP, "3rd Generation Partnership Project; Technical Specification Group Radio Access Network; Radio Resource Control (RRC); Protocol specification (Release 8)", "3GPP TS 25.331 V8.19.0 (Jun. 2012),". Jun. 2012. pp. 1-1722.

3GPP, "3rd Generation Partnership Project; Technical Specification Group Radio Access Network; UTRAN Iub interface Node B Application Part (NBAP) signalling (Release 8)", 3GPP TS 25.433 V8.12.0 (Jun. 2011). Jun. 2011. pp. 1-1180.

Unknown Author, "Agenda", Author Unknown, "Agenda," S3GPP TSG-RAN WG3 #77bis; R3-122028; Oct. 8-12, 2012. pp. 1-28.

Unknown Author, "Implicit release timer for standalone HS-DPCCH transmission", 3GPP TSG-RAN WG2 Meeting #77bis R2-121500 Jeju, South Korea, Mar. 26-30, 2012, 1-2.

Unknown Author, "RAN2 related issues on stand-alone HS-DPCCH", 3GPP TSG-RAN WG2 #77 R2-120413 Dresden, Germany, Feb. 6-10, 2012, 1-2.

Unknown Author, "RAN3 impacts on standalone HS-DPCCH", 3GPP TSG-RAN WG3 #76 R3-121007 Prague, Czech Public, May 21-25, 2012, 1-3.

Unknown Author , "TSN re-ordering ambiguities solutions", 3GPP TSG-RAN3 Meeting #74 R3-112789 San Francisco, USA, Nov. 14-18, 2011, 1-2.

"Clarification and Correction on SI Triggering for Implicit Release", 3GPP TSG-RAN2, Meeting #68, R2-096588, Nokia Siemens Networks, Nokia Corporation, Jeju, Korea, Nov. 9-13, 2009, pp. 1-9.

"RAN3 Impacts on DL Triggered HS-DPCCH", 3GPP TSG-RAN WG3 #77, R3-121579, Huawei, Qingdao, China, Aug. 13-17, 2012, pp. 1-2.

\* cited by examiner

METHODS AND APPARATUSES FOR USE IN A MOBILE COMMUNICATION NETWORK

RELATED APPLICATIONS

This application is a continuation of co-pending U.S. patent application Ser. No. 13/995,683, filed 19 Jun. 2013, which is a national stage entry under 35 U.S.C. § 371 of international patent application serial no. PCT/SE2013/050362, filed 2 Apr. 2013, which claims priority to and the benefit of U.S. provisional patent application Ser. No. 61/682,442, filed 13 Aug. 2012. The entire contents of each of the aforementioned applications is incorporated herein by reference.

TECHNICAL FIELD

The technology relates to radio communications and efficient use of radio resources.

BACKGROUND

The technology in this application is described in a non-limiting example UMTS Terrestrial Radio Access Network, UTRAN/Wideband Code Division Multiple Access, WCDMA, network that supports High Speed Packet Access, HSPA. A basic example of an UTRAN/HSPA type of system is illustrated in FIG. 1. This example network basically comprises a number of base stations, also called Node Bs 100-1, 100-2; 4, 6, and one or more Radio Network Controllers, RNCs, 200-1, 200-2; 8. A RNC provides control functionality for one or more Node Bs. The RNC 200-1; 8 also communicates with one or more core network nodes in the Core Network, CN, 400, which may be connected to one or more other networks, e.g., the Internet, public and private telephone networks, etc. The RNC and its corresponding Node Bs are often denoted the Radio Network Subsystem, which provides the basic radio access for one or more User Equipments, UEs, 300; 14. There are a number of interfaces in the network. The Uu interface connects the Node B and the UE. The Tub interface connects the RNC and the Node B. The Iur interface connects two RNCs to each other. The IuCS and IuPS interfaces connect the RNC and the CN.

This type of network normally supports a connection state for a UE in which dedicated radio resources are allocated to the UE for communication with the network, and another connection state in which common radio resources such as common Enhanced Dedicated Channel, E-DCH, resources are available to the UE.

The common resources may be released in several ways, for example explicitly by the network or implicitly by the UE. In the latter case, the UE basically maintains the common radio resources until it has emptied its transmit buffer, possibly waiting for an inactivity timer to expire, and then releases the common radio resources. The UE typically releases the resources after scheduling information with a report of empty buffer status has been transmitted to the network, and after the last retransmission process has been acknowledged or the maximum number of retransmissions has been reached. The reception of the scheduling information with the empty buffer status report from the UE will normally be interpreted by the network as an implicit release by the UE, and the network then also releases the resources on the network side.

The inactivity timer, which is also referred to as a timer for implicit release of common resources or simply an implicit release timer, is controlled by the RNC and broadcasted to the relevant UE(s) in the system information. The inactivity timer is normally used because the UE may have new data to transmit just a few ms after the completion of the last transmission. The selected value of the timer is related to the trade-off between releasing the resources as quickly as possible in order to be able to assign the resources to another user and the risk of receiving a request from the same user immediately after releasing the resources.

However, if the inactivity timer in the UE is enabled, it has been noted that there may be situations when the network incorrectly releases the common resources, resulting in radio link failures and data losses.

There is thus a need for a more robust solution for release of common resources in radio communication networks.

SUMMARY

The proposed technology overcomes these and other drawbacks of the prior art.

It is a general object to provide support for correct release of common radio resources in a radio communication network.

This and other objects are met by the proposed technology as defined by the appended patent claims.

According to a first aspect, there is provided a method performed by a base station for supporting release of common radio resources in a radio communication network. The base station receives an indication of a value of a timer for implicit release of common radio resources from a radio network controller, and the base station determines whether to release common radio resources based on the indication of a value of the timer for implicit release of common radio resources.

According to a second aspect there is provided a method performed by a radio network controller for supporting release of common radio resources in a radio communication network. The radio network controller sends an indication of a value of a timer for implicit release of common radio resources to a base station to enable the base station to determine whether to release common radio resources based on the indication of a value of the timer for implicit release of common radio resources.

According to a third aspect, there is provided a base station for a radio communication network. The base station comprises an interface configured to receive an indication of a value of a timer for implicit release of common radio resources from a radio network controller. The base station also comprises a processing module configured to determine whether to release common radio resources based on the indication of a value of the timer for implicit release of common radio resources.

According to a fourth aspect, there is provided a radio network controller for a radio communication network. The radio network controller comprises an interface configured to send an indication of a value of a timer for implicit release of common radio resources to a base station to enable the base station to determine whether to release common radio resources based on the indication of a value of the timer for implicit release of common radio resources.

According to a fifth aspect, there is provided a method for supporting release of common Enhanced Dedicated Channel, E-DCH, resources in a radio communication network, wherein a base station is receiving a PHYSICAL SHARED CHANNEL RECONFIGURATION REQUEST message from a radio network controller including a 'Common E-DCH Implicit Release Timer' information element, IE, that indicates whether a 'E-DCH transmission continuation back off' period is set to zero or to a value different from zero.

According to a sixth aspect, there is provided a base station for a radio communication network, wherein the base station is configured for receiving a PHYSICAL SHARED CHANNEL RECONFIGURATION REQUEST message from a radio network controller including a 'Common E-DCH Implicit Release Timer' information element, IE, that indicates whether a 'E-DCH transmission continuation back off' period is set to zero or to a value different from zero.

According to a seventh aspect, there is provided a method for supporting release of common Enhanced Dedicated Channel, E-DCH, resources in a radio communication network, wherein a radio network controller is sending a PHYSICAL SHARED CHANNEL RECONFIGURATION REQUEST message to a base station including a 'Common E-DCH Implicit Release Timer' information element to indicate whether a 'E-DCH transmission continuation back off' period is set to zero or to a value different from zero.

According to an eighth aspect, there is provided a radio network controller for a radio communication network, wherein the radio network controller is configured for sending a PHYSICAL SHARED CHANNEL RECONFIGURATION REQUEST message to a base station including a 'Common E-DCH Implicit Release Timer' information element to indicate whether a 'E-DCH transmission continuation back off' period is set to zero or to a value different from zero.

In this way, by using the indication of a value of the timer for implicit release the base station will be able to correctly determine whether to release the common resources upon reception of a report of empty buffer status from a UE. This will eliminate misinterpretations of the empty buffer status report, and avoid unnecessary radio link failures.

Other advantages will be appreciated when reading the detailed description.

BRIEF DESCRIPTION OF THE DRAWINGS

The proposed technology, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present technology relates to the scenario when common radio resources such as common Enhanced Dedicated Channel, E-DCH, resources are available to the UE. The common resources may be released in several ways, for example explicitly by the network or implicitly by the UE. In the latter case, the UE basically maintains the common radio resources until it has emptied its transmit buffer, possibly waiting for an inactivity timer to expire, and then releases the common radio resources.

As previously mentioned, if the inactivity timer in the UE is not enabled, the procedure for implicit release works fine. However, if the inactivity timer in the UE is enabled, it has been noted that there may be situations when the network incorrectly releases the common resources, resulting in radio link failures and data losses.

The inventors have realized that this has to do with the fact that if enough space is available at the end of a packet data unit, the UE may attach scheduling information with an empty buffer status indication regardless of whether the inactivity timer has expired. Such an empty buffer status indication may then be misinterpreted by the network as an implicit release by the UE, although the inactivity timer has not yet expired. If the network incorrectly releases the resources, the UE will detect a radio link failure if the UE wants to resume transmission before the inactivity timer has expired, and data will be lost.

Figure 1:
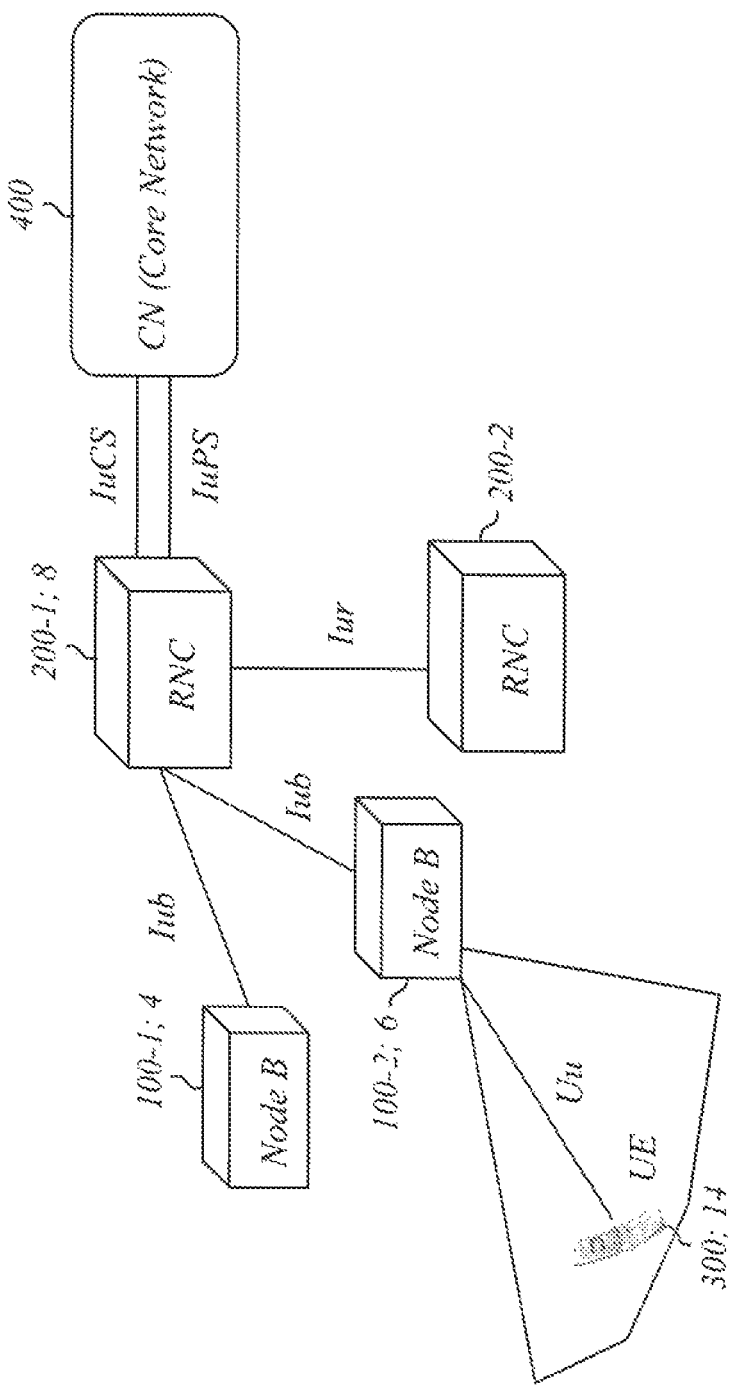
FIG. 1 is a schematic diagram illustrating an example of a UTRAN/HSPA type communication network.
Figure 2:
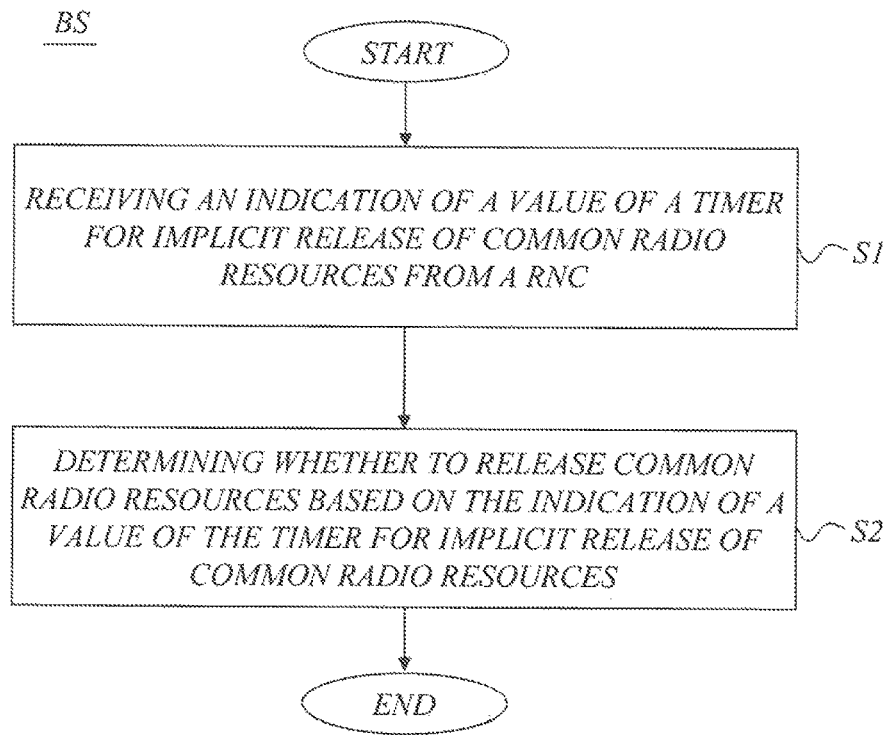
FIG. 2 is a schematic flow diagram illustrating an example of a method performed by a base station for supporting release of common radio resources in a radio communication network according to an embodiment.

FIG. 2 is a schematic flow diagram illustrating an example of a method performed by a base station, BS, for supporting release of common radio resources in a radio communication network according to an embodiment. In step S1, the base station receives an indication of a value of a timer for implicit release of common radio resources from a radio network controller. In step S2, the base station determines whether to release common radio resources based on the indication of a value of the timer for implicit release of common radio resources.

By using the indication of a value of the timer for implicit release the base station will be able to correctly determine whether to release the common resources upon reception of a report of empty buffer status from a UE. This will eliminate misinterpretations of the empty buffer status report, and avoid unnecessary radio link failures.

Step S2 is sometimes referred to as a 'common resource release decision' in the relevant 3GPP standards.

In a particular embodiment, the common radio resources are common Enhanced Dedicated Channel, E-DCH, resources, and the indication of a value of the timer for implicit release is an indication of a value of a timer for implicit release of common E-DCH resources.

The indication of a value of the timer for implicit release of common E-DCH resources may for example indicate whether a 'E-DCH transmission continuation back off' period is set to zero or to a value different from zero.

As previously implied, the step S2 of the base station determining whether to release common radio resources may be performed upon reception of a report of empty buffer status from a User Equipment, UE.

In particular, the report of empty buffer status may be received as piggybacked Scheduling Information, SI, with a Total E-DCH Buffer Status, TEBS, value equal to zero, as will be explained in detail later on.

Figure 3:
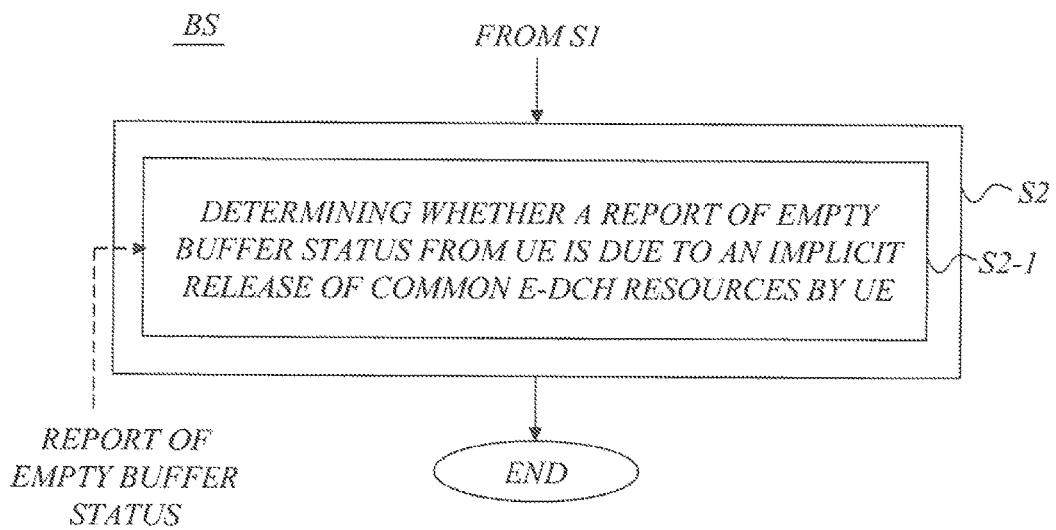
FIG. 3 is a schematic flow diagram illustrating a particular example of the determining step of FIG. 2 according to an embodiment.

In a particular example embodiment, as illustrated in FIG. 3, when the common radio resources are common Enhanced Dedicated Channel, E-DCH, resources, and the indication of a value of a timer for implicit release of common radio resources is an indication of a value of a timer for implicit release of common E-DCH resources, the step S2 of the base station determining whether to release common resources includes the step S2-1 of the base station determining, based on the indication of a value of the timer for implicit release of common E-DCH resources, whether the report of empty buffer status from a User Equipment, UE, is due to an implicit release of common E-DCH resources by the UE.

By way of example, the method may include the step where the base station releases the common E-DCH resources if the indication of a value of the timer for implicit release of common E-DCH resources is equal to zero.

On the other hand, the method may include the step where the base station does not release the common E-DCH resources if said indication of a value of said timer for implicit release of common E-DCH resources is different from zero. In other words, the base station maintains the common E-DCH resources in this case. For additional details, reference can be made to FIG. 10.

In this example, it is thus sufficient to indicate whether the timer for implicit release is zero or not. However, the indication of a value of the timer for implicit release may alternatively indicate the exact value of the timer such as the exact value of the 'E-DCH transmission continuation back off' period. Other examples will be described later on.

As will be explained in detail later on, the indication of a value of the timer for implicit release of common radio resources may for example be received in a PHYSICAL SHARED CHANNEL RECONFIGURATION REQUEST message.

The PHYSICAL SHARED CHANNEL RECONFIGURATION REQUEST message is part of the signaling over the so-called Iub interface between RNC and Node B.

The indication of a value of the timer for implicit release of common radio resources may be included in a new 'Common E-DCH Implicit Release Timer' information element in the PHYSICAL SHARED CHANNEL RECONFIGURATION REQUEST message.

As an example, the indication of a value of the timer for implicit release of common radio resources in the 'Common E-DCH Implicit Release Timer' information element is defined to be of ENUMERATED type with values zero or more than zero.

Embodiments of the present technology will now be described from the perspective of the radio network controller.

Figure 5:
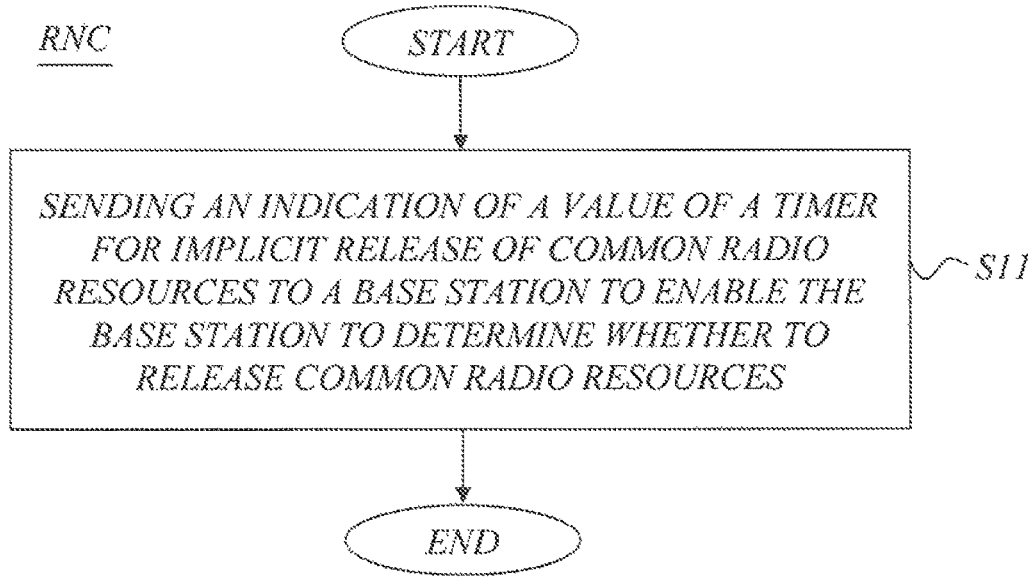
FIG. 5 is a schematic flow diagram illustrating an example of a method performed by a radio network controller for supporting release of common radio resources in a radio communication network according to an embodiment.

FIG. 5 is a schematic flow diagram illustrating an example of a method performed by a radio network controller for supporting release of common radio resources in a radio communication network according to an embodiment. In step S11, the radio network controller sends an indication of a value of a timer for implicit release of common radio resources to a base station to enable the base station to determine whether to release common radio resources based on the indication of a value of the timer for implicit release of common radio resources.

In a particular embodiment, the common radio resources are common Enhanced Dedicated Channel, E-DCH, resources, and the indication is an indication of a value of a timer for implicit release of common E-DCH resources.

By way of example, the indication of a value of the timer for implicit release of common E-DCH resources may indicate whether a 'E-DCH transmission continuation back off' period is set to zero or to a value different from zero.

In a particular example embodiment, the radio network controller sends the indication of a value of said timer for implicit release of common E-DCH resources to the base station to enable the base station to determine, based on the indication of a value of the timer for implicit release of common E-DCH resources, whether to release common E-DCH resources upon reception of a report of empty buffer status from a User Equipment, UE.

More specifically, the radio network controller sends the indication of a value of the timer for implicit release of common E-DCH resources to the base station to enable the base station to determine, based on the indication of a value of the timer for implicit release of common E-DCH resources, whether to release common E-DCH resources upon reception of piggybacked Scheduling Information, SI, with a Total E-DCH Buffer Status, TEBS, value equal to zero from a User Equipment, UE.

For example, the radio network controller sends the indication of a value of said timer for implicit release of common E-DCH resources to the base station to enable the base station to release, upon reception of the report of empty buffer status from the UE, the common E-DCH resources if the indication of a value of the timer for implicit release of common E-DCH resources is equal to zero. Complementary, the base station is enabled to not release, i.e. maintain, the common E-DCH resources if the indication of a value of the timer for implicit release of common E-DCH resources is different from zero.

The radio network controller may for example send the indication of a value of a timer for implicit release of common radio resources to the base station in a PHYSICAL SHARED CHANNEL RECONFIGURATION REQUEST message.

The indication of a value of said timer for implicit release of common radio resources may then be included in a 'Common E-DCH Implicit Release Timer' information element in the PHYSICAL SHARED CHANNEL RECONFIGURATION REQUEST message.

Figure 6:
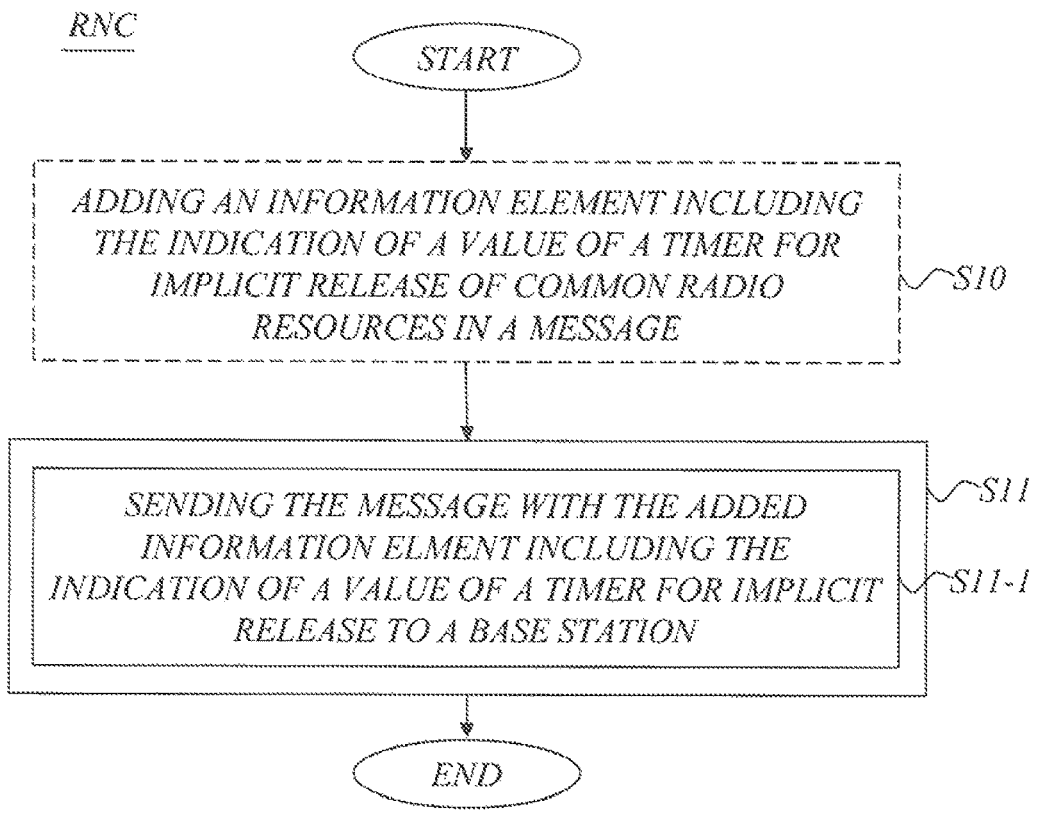
FIG. 6 is a schematic flow diagram illustrating an example of a method performed by a radio network controller for supporting release of common radio resources in a radio communication network according to another embodiment

In a particular example, schematically illustrated in the flow diagram of FIG. 6, the method comprises the optional step (S10) of the radio network controller adding an information element including the indication of a value of a timer for implicit release of common radio resources in a message.

The step (S11) of the radio network controller sending an indication of a value of a timer for implicit release of common radio resources then comprises the step (S11-1) of the radio network controller sending the message with the added information element including the indication of a value of a timer for implicit release of common radio resources to the base station. For example, the radio network controller initially provides the value of the timer for implicit release, adds the new information element including the indication of the timer value in the message and finally sends the message to the base station.

By way of example, the indication of a value of said timer for implicit release of common radio resources in the 'Common E-DCH Implicit Release Timer' information element is defined to be of ENUMERATED type with values zero or more than zero.

Figure 8:
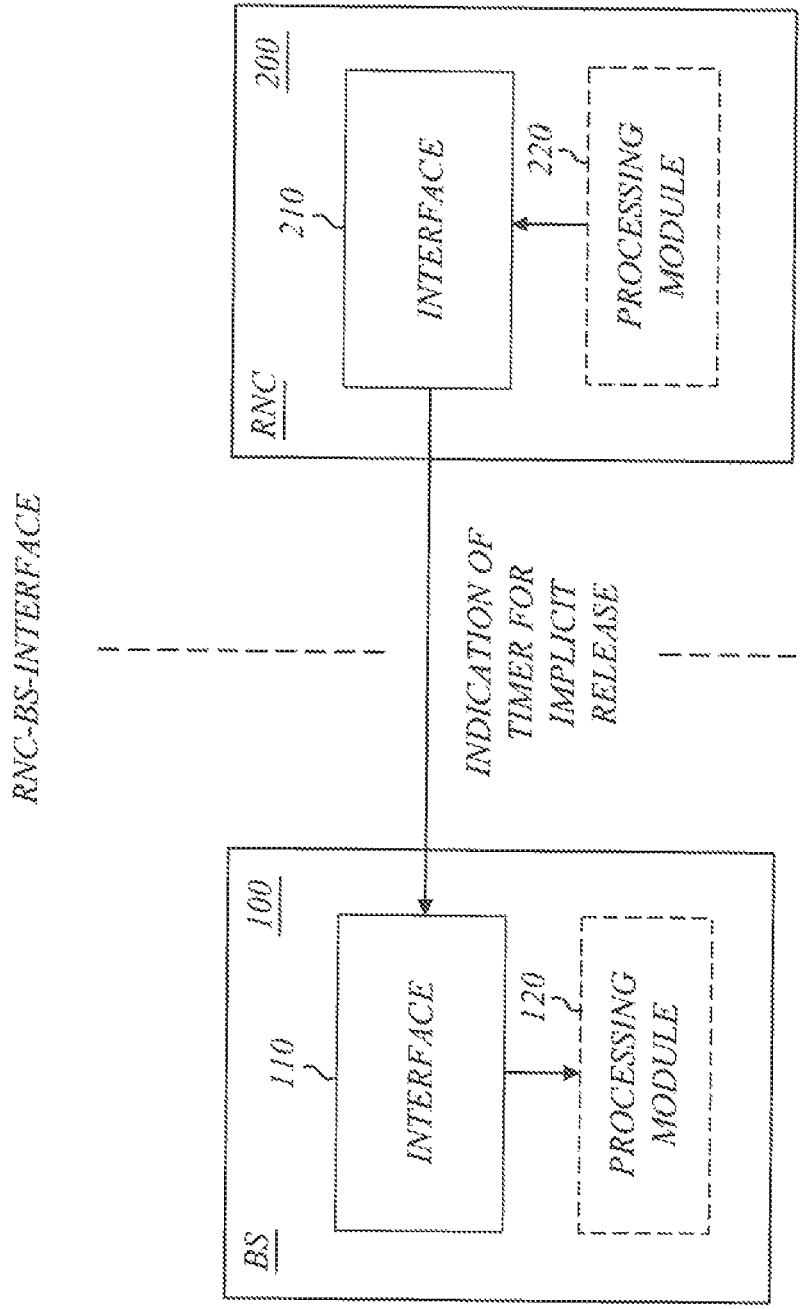
FIG. 8 is a schematic block diagram illustrating an example of a base station and a radio network controller for a radio communication network and the corresponding RNC-BS interface according to an embodiment.

FIG. 8 is a schematic block diagram illustrating an example of a base station, BS, and a radio network controller, RNC, for a radio communication network and the corresponding RNC-BS interface according to an embodiment.

The base station 100 comprises an interface 110 configured to receive an indication of a value of a timer for implicit release of common radio resources from the radio network controller 200. The base station further comprises a processing module 120 configured to determine whether to release common radio resources based on the indication of a value of the timer for implicit release of common radio resources.

The radio network controller 200 comprises an interface 210 configured to send an indication of a value of a timer for implicit release of common radio resources to a base station to enable the base station to determine whether to release common radio resources based on the indication of a value of the timer for implicit release of common radio resources.

The RNC-BS interface thus includes a novel indication of a value of a timer for implicit release of common radio resources.

Figure 9:
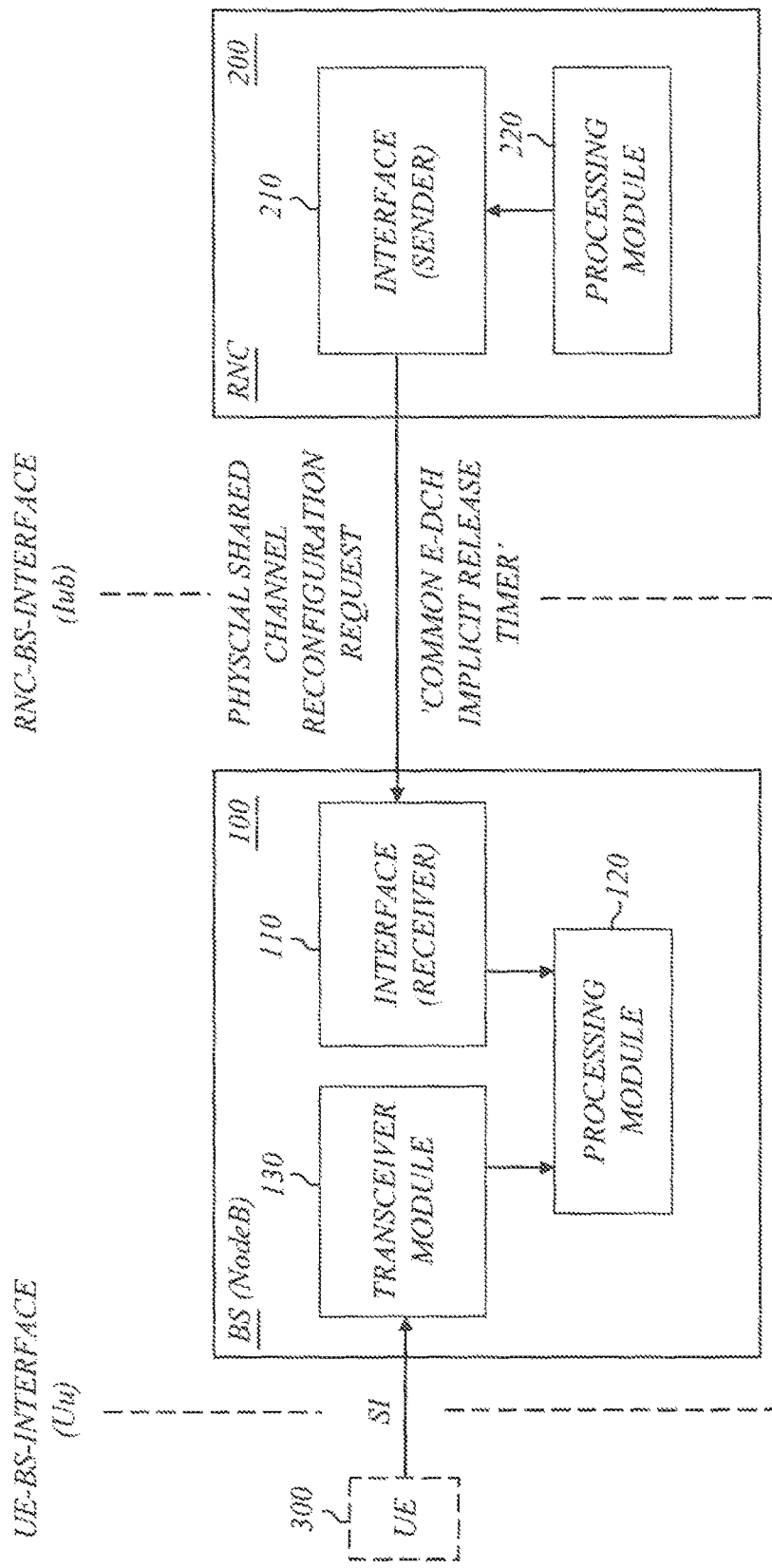
FIG. 9 is a schematic block diagram illustrating a particular example of a base station and a radio network controller and the corresponding RNC-BS interface according to an embodiment, including also an illustration of the UE-BS interface between the base station and a UE.

FIG. 9 is a schematic block diagram illustrating a particular example of a base station and a radio network controller and the corresponding RNC-BS interface according to an embodiment, including also an illustration of the UE-BS interface between the base station and a UE.

Preferably, the interface 110 is configured to receive an indication of a value of a timer for implicit release of common Enhanced Dedicated Channel, E-DCH, resources, and the processing module 120 is configured to determine whether to release common E-DCH resources.

In this connection, the interface 110 may be configured to receive the indication of a value of the timer for implicit release of common E-DCH resources in the form of an indication of whether a value of a 'E-DCH transmission continuation back off' period is set to zero or to a value different from zero.

Typically, the processing module 120 is configured to determine, based on the indication of a value of the timer for implicit release of common radio resources whether to release common radio resources upon reception of a report of empty buffer status from a User Equipment, UE.

In particular, the base station 100 may also include a transceiver module 130 configured to receive the report of empty buffer status as piggybacked Scheduling Information, SI, with a Total E-DCH Buffer Status, TEBS, value equal to zero.

By way of example, the processing module 120 may be configured to release the common E-DCH resources if the indication of a value of said timer for implicit release of common E-DCH resources is equal to zero.

On the other hand, the processing module 120 may be configured to maintain the common E-DCH resources if the indication of a value of the timer for implicit release of common E-DCH resources is different from zero. In other words, the common E-DCH resources are not released in this case, at least not as long as the timer for implicit release is different from zero.

In a particular example embodiment, the interface 110 is configured to receive the indication of a value of the timer for implicit release of common radio resources in a 'Common E-DCH Implicit Release Timer' information element in a PHYSICAL SHARED CHANNEL RECONFIGURATION REQUEST message.

It should be understood that the 'Common E-DCH Implicit Release Timer' information element, IE, is a new IE added to the 'Common E-DCH System Information' information element of the PHYSICAL SHARED CHANNEL RECONFIGURATION REQUEST message.

The PHYSICAL SHARED CHANNEL RECONFIGURATION REQUEST message is part of the signaling over the so-called Iub interface between RNC and Node B.

From the RNC perspective once again, the interface 210 of the RNC 200 is preferably configured to send an indication of a value of a timer for implicit release of common Enhanced Dedicated Channel, E-DCH, resources to enable the base station to determine whether to release common E-DCH resources.

The interface 210 may for example be configured to send the indication of a value of the timer for implicit release of common E-DCH resources in the form of an indication of whether a value of a 'E-DCH transmission continuation back off' period is set to zero or to a value different from zero.

In a particular example, the radio network controller 200 further comprises an optional processing module 220 configured to add an information element including the indication of a value of the timer for implicit release of common radio resources in a message. The interface 210 is then configured to send the message to the base station.

By way of example, the radio network controller 200 further comprises a processing module 220 configured to include the indication of a value of the timer for implicit release of common radio resources in a 'Common E-DCH Implicit Release Timer' information element in a PHYSICAL SHARED CHANNEL RECONFIGURATION REQUEST message. The interface 210 is then configured to send the PHYSICAL SHARED CHANNEL RECONFIGURATION REQUEST message to the base station 100.

The RNC-BS interface may for example be the Iub interface, and the UE-BS interface may be the Uu interface.

For a better understanding of the proposed technology, a brief overview and analysis of a particular type of example network will now be described. The proposed technology is not limited thereto.

By way of example, a WCDMA/HSPA network supports a CELL Forward Access Channel, CELL_FACH, state and a CELL Dedicated Channel, CELL_DCH, state. CELL_FACH state is a connection state (or mode) for a UE in which only common radio resources are available to the UE for communication with the network, i.e., no dedicated radio resources are allocated to the UE. The CELL_DCH state is a connection state (or mode) for a UE in which dedicated radio resources have been allocated to the UE.

For Frequency Division Duplexing, FDD, the E-DCH transmission in CELL_FACH state and Idle Mode is a mechanism to improve the performance of the random access procedure. The Enhanced Uplink in CELL_FACH state and Idle mode combines the Release-99 random access power ramping phase with E-DCH transmission on common E-DCH resources. The network can configure up to 32 common E-DCH resources in one cell. The configuration information is broadcast by system information (see 5/5bis).

The E-DCH random access procedure includes the following steps:
1—Access Request preamble transmissions with preamble power ramping as in Rel-99;
2—Acquisition Indication and assignment of a common E-DCH resource;
3—Data transmission over the assigned E-DCH channel, which is used to carry either a Common Control Channel, CCCH, transmission or Dedicated Traffic Channel/Dedicated Control Channel, DTCH/DCCH, transmission;
4—Release of the common E-DCH Resource.

For dedicated channels, like DCCH/DTCH, common E-DCH resources can be released in the following ways:
1—Explicitly by the Node B sending a release command on the E-DCH Absolute Grant Channel, E-AGCH, during the collision resolved phase.
2—If configured by the network, implicitly by the UE. The UE releases the resources after an empty buffer status has been reported in the SI to the Node B, and after the last HARQ process has been acknowledged or maximum number of retransmissions has been reached.
3—If contention resolution fails, i.e., no absolute grant is received by the UE.
4—During state transition from CELL_FACH to CELL_DCH.
5—Upon a radio link failure.

Regarding the implicit release, 3GPP TS 25.321 [1], section 11.2.2A, incorporated herein by reference, specifies the following:
Implicit release with E-DCH transmission continuation backoff
Implicit resource release is enabled only if "E-DCH transmission continuation back off" is not set to "infinity".
If implicit resource release is enabled, then in case of DTCH/DCCH transmission, the timer Tb is set to "E-DCH transmission continuation back off" value, when TEBS is 0 byte and the last generated MAC-i PDU with higher layer data is provided with the PHY-data-REQ primitive to the physical layer for transmission.
If TEBS < > 0 byte is detected while timer Tb is running, then the timer is stopped and uplink data transmission on the common E-DCH resource continues.
If a MAC-ehs PDU is received while timer Tb is running, then the tinter is re-started.
If the "E-DCH transmission continuation back off" value is set to "0" or if timer Tb expires the MAC-STATUS-Ind primitive indicates to RLC for each logical channel that no PDUs shall be transferred to MAC. TEBS=0 byte is reported to the Node B MAC as SI in a MAC-i PDU. If the "E-DCH transmission continuation back off" value is set to "0", then the SI shall be transmitted with the MAC-i PDU carrying the last DCCH/DTCH data, given the serving grant is sufficient to carry the SI in the same MAC-i PDU together with the remaining DCCH/DTCH data. Otherwise, the empty buffer status report is transmitted separately with the next MAC-i PDU.
CMAC-STATUS-Ind which informs the RRC about the Enhanced Uplink in CELL_FACH state and Idle mode process termination is triggered when the empty buffer status has been reported and no MAC-i PDU is left in any HARQ process for (re)transmission.

3GPP TS 25.321 [1], section 9.2.5.3.2, incorporated herein by reference, defines for FDD the Total E-DCH Buffer Status as follows
Total E-DCH Buffer Status (TEBS):
The TEBS field identifies the total amount of data available across all logical channels for which reporting has been requested by the RRC and indicates the amount of data in number of bytes that is available for transmission and retransmission in RLC layer. If MAC-i/is is configured, it also includes the amount of data that is available for transmission in the MAC-i/is segmentation entity. When MAC is connected to an AM RLC entity, control PDUs to be transmitted and RLC PDUs outside the RLC Tx window shall also be included in the TEBS. RLC PDUs that have been transmitted but not negatively acknowledged by the peer entity shall not be included in the TEBS.

Section 11.8.1.6 "Scheduling Information reporting" of [1] specifies how the Scheduling Information shall be triggered in case of CCCH transmission in Cell FACH state:
In CELL_DCH state, when MAC-i is configured, and in CELL_FACH state for FDD and for DCCH/DTCH transmission, if the size of the data plus header is less than or equal to the TB size of the E-TFC selected by the UE minus 18 bits, a Scheduling Information shall be concatenated into this MAC-i PDU. Otherwise a Scheduling Information is not included. [ . . . ]
For FDD and for DTCH/DCCH transmission in CELL_FACH state, the transmission of Scheduling Information shall be triggered once, if the TEBS remains zero and no higher layer data remains in MAC to be transmitted for a period given by the E-DCH transmission continuation back off period unequal "infinity". For FDD and for DTCH/DCCH transmission in CELL_FACH state with E-DCH transmission continuation back off period set to "infinity" or "zero", the transmission of Scheduling Information shall be triggered each lime when the TEBS becomes zero and no higher layer data remains in MAC to be transmitted after the transmission of the MAC-i PDU containing the scheduling information with the empty buffer status report. When "E-DCH transmission continuation back off" is set to "infinity", the Scheduling Information with empty buffer status report shall be transmitted with the MAC-i PDU carrying the last DCCH/DTCH data, given the serving grant is sufficient to carry the SI in the same MAC-i PDU together with the remaining DCCH/DTCH data. Otherwise, the Scheduling Information with empty buffer status report is transmitted separately with the next MAC-i PDU.

The RNC communicates to the Node B the enabling of the implicit release using an Information Element contained in the "Common E-DCH System Information" (Ref [3] section 9.2.2.103):

| >Common E-DCH implicit release indicator | M | BOOLEAN | TRUE means implicit release is in use. FALSE means implicit release is not in use. | — |

The Node B is not aware of the "E-DCH transmission continuation back off" value.

If Implicit resource release is enabled, then the transmission of the Scheduling Information with a TEBS value equal to zero will determine the release of the common E-DCH resources by the UE. The indication of TEBS=0 may be also used by the network in order to release the common E-DCH resources assigned to that UE.

If implicit resource release is enabled, then in case of DTCH/DCCH transmission, the timer Tb, also referred to as the inactivity timer or implicit release timer, is set to "E-DCH transmission continuation back off" value, when TEBS is 0 byte and the last generated MAC-i PDU with higher layer data is provided with the PHY-data-REQ primitive to the physical layer for transmission. That means that if the timer Tb is set to a value different from 0, the UE will not send the SI as soon as TEBS=0 is detected, but it will have to wait for the timer expiry. At the same time, if enough space is available at the end of a MAC-i PDU during DCCH/DTCH transmission in CELL_FACH state, the UE attaches the Scheduling Information. If during a DCCH/DTCH transmission in CELL_FACH the TEBS value becomes 0, and there is enough space at the end of a MAC-i PDU, the UE will attach a Scheduling Information with TEBS=0 indication, regardless of whether the Tb timer has expired.

From a UE perspective this does not represent an issue, as the release of the common E-DCH resources is not affected by the sending of this SI with TEBS=0 (in order to release the resources the UE will have to trigger once more the SI with TEBS=0 when the timer Tb expires).

The Node B is not aware of whether the SI with TEBS=0 corresponds to an implicit release from the UE. This is due to the fact that the Node B is not aware of the "E-DCH transmission continuation back off" value, hence cannot determine if the timer Tb has expired. Nor is the Node B aware of whether the SI is simply triggered because of enough space in the MAC-i PDU, but the timer Tb has not expired yet. This means that as soon as the network gets the Scheduling Information (SI) with TEBS set to 0, the network will understand that the UE is implicitly releasing the resources. However, this may not be the case. If the network uses the SI to release the resources when SI indicates TEBS set to 0, then the UE will detect a radio link failure and data may be lost.

In a particular example embodiment, the proposed technology provides improved support for implicit release using scheduling information for dedicated channel, e.g., DCCH/DTCH, transmission in CELL_FACH state and Idle mode. The Node B is made aware of whether the "E-DCH transmission continuation back off" value is set to 0 or to a value different from 0. In this way, upon reception of a piggybacked SI with TEBS=0, the Node B itself can determine whether that is due to an implicit release or not. A piggybacked SI is Scheduling Information that is sent together (concatenated) with data, e.g. in a MAC PDU, if there are enough spare bits at the end of the MAC PDU.

The following sets forth specific details, such as particular non-limiting example embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, Application Specific Integrated Circuits, ASICs, Programmable Logic Arrays, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, Digital Signal Processor, DSP, hardware, a reduced instruction set processor, hardware (e.g., digital or analog) circuitry including but not limited to Application Specific Integrated Circuit(s), ASICs, and/or Field Programmable Gate Array(s), FPGA(s), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

It should be understood by the skilled in the art that "UE" is a non-limiting term comprising any wireless device or node equipped with a radio interface allowing for at least one of: transmitting signals in Uplink, UL, and receiving and/or measuring signals in Downlink, DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode.

A cell is associated with a base station, where a base station comprises in a general sense any node transmitting radio signals in the downlink, DL, and/or receiving radio signals in the uplink, UL. Some example base stations are eNodeB, eNB, Node B, macro/micro/pico radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single Radio Access Technology, RAT, multi-RAT, or multi-standard node, e.g., using the same or different base band modules for different RATs.

The signaling described is either via direct links or logical links (e.g. via higher layer protocols and/or via one or more network nodes). For example, signaling from a coordinating node may pass another network node, e.g., a radio node.

The example embodiments are described in the non-limiting example context of a UTRAN type system. However, the technology is not limited to UTRAN, but may apply to any Radio Access Network, RAN, single-RAT or multi-RAT. Some other RAT examples are Long Term Evolution Advanced, LTE-Advanced, Universal Mobile Telecommunications System, UMTS, Global System for Mobile communications, GSM, cdma2000, WiMAX, and WiFi. If applying the technology to LTE, for example, those skilled in the art will understand that the MAC entities in LTE have different names and functionalities.

In general, after an initial data transmission by a UE to a base station, e.g., Node B, using common or shared radio resource(s) (e.g., common E-DCH resources) allocated by the Node B, where the UE is in a first connection state or mode in the Node B cell in which only common radio resources are available to the UE, e.g., a CELL_FACH session, the UE maintains the common radio resource(s) until an inactivity timer expires. During a CELL_FACH session, an inactivity timer is used for determining when the UE needs to release the allocated common resources. After the UE empties its transmit buffer, the inactivity timer starts, and once it reaches a predetermined timer expiration value, the UE releases its allocated common resources. Thereafter, another data transmission from the UE must start from the random access procedure. The inactivity timer, which is also referred to as a timer for implicit release of common resources or simply an implicit release timer, is controlled by the RNC and broadcasted to the relevant UE(s) in the system information.

Figure 10:
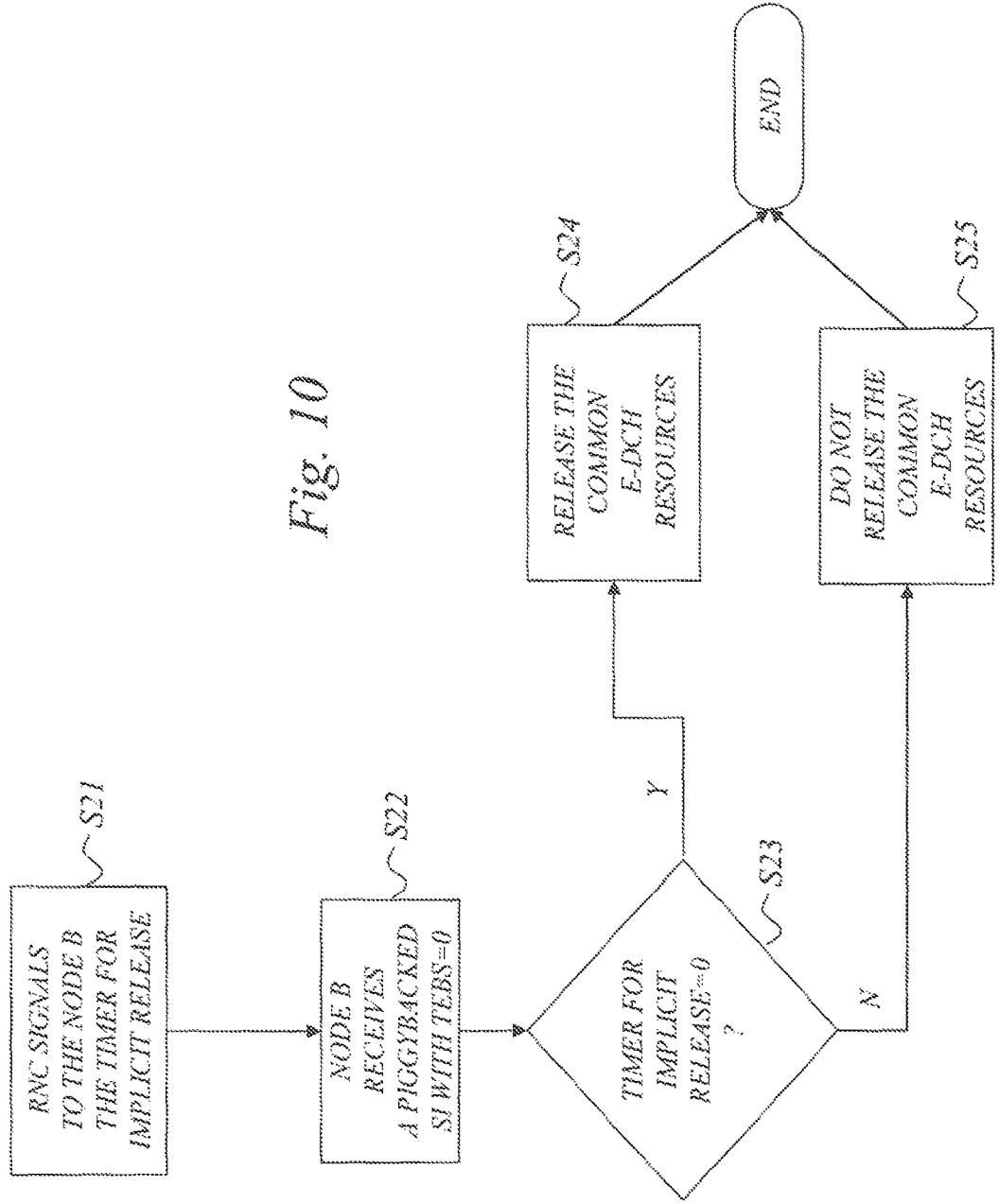
FIG. 10 is a schematic flow diagram illustrating yet another particular example of a method for supporting release of common radio resources.

FIG. 10 is a flowchart diagram illustrating example procedures in accordance with one non-limiting embodiment. In step S21, the RNC signals to the Node B the timer for implicit release. In step S22, the base station (Node B), at some time, receives a piggybacked SI with TEBS=0. In step S23, it is determined in the base station whether the timer for implicit release=0. If the timer for implicit release=0 (Y), the base station releases the common E-DCH resources in step S24. If the timer for implicit release≠0 (N), the base station does not release the common E-DCH resources in step S25.

By way of example, a new information element (IE) or other type of message or signal can be added to indicate the E-DCH transmission continuation back off timer for implicit release, i.e. the implicit release timer. The value in an example embodiment is signaled from a Controlling Radio Network Controller, CRNC, to a Node B. The CRNC is the RNC responsible for the configuration of the considered Node B.

In another example embodiment, the CRNC may add the new timer value in the Node B Application Part, NBAP, control plan message. In the 3GPP UTRAN architecture, NBAP is the signaling protocol responsible for control of the Node B by the RNC, and forms part of the Iub interface.

In another example embodiment, the CRNC may indicate whether the timer is zero or larger than zero.

In another example embodiment, the CRNC may indicate to the Node B whether Tb shall be set or not (if the continuation back-off timer is 0, then the UE does not set Tb).

In another example embodiment, the CRNC may indicate the exact value of the implicit timer to Node B.

For example, the new IE may be added into the Physical Shared Channel Reconfiguration procedure and into the message PHYSICAL SHARED CHANNEL RECONFIGURATION REQUEST. When the Node B gets the implicit timer value, it applies the value for the Enhanced Cell FACH related configuration. In this way, the new implicit timer value is the same for the whole cell. Other examples can add the value in other NBAP messages, or introduce the value in a new message.

Below is definition of the NBAP of TS 25.433 (rev 11.0.0) (chapter 9.1.62.1), incorporated herein by reference, PHYSICAL SHARED CHANNEL RECONFIGURATION REQUEST. The new IE can be added, for example, into IE Common E-DCH System Information.

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| C-ID | M | | 9.2.1.9 | | YES | reject |
| Configuration Generation ID | M | | 9.2.1.16 | | YES | reject |
| SFN | O | | 9.2.1.53A | | YES | reject |
| HS-PDSCH, HS-SCCH, E-AGCH, E-RGCH and E-HICH Total Power | O | | Maximum Transmission Power 9.2.1.40 | Maximum transmission power to be allowed for HS-PDSCH, HS-SCCH, E-AGCH, E-RGCH and E-HICH codes | YES | reject |
| HS-PDSCH And HS-SCCH Scrambling Code | O | | DL Scrambling Code 9.2.2.13 | Scrambling code on which HS-PDSCH and HS-SCCH is transmitted. 0 = Primary scrambling code of the cell 1 . . . 15 = Secondary scrambling code | YES | reject |
| HS-PDSCH FDD Code Information | O | | 9.2.2.18F | | YES | reject |
| HS-SCCH FDD Code Information | O | | 9.2.2.18G | | YES | reject |

-continued

| IE/Group Name | Presence | Range | IE Type and Reference | Semantics Description | Criticality | Assigned Criticality |
|---|---|---|---|---|---|---|
| E-AGCH And E-RGCH/E-HICH FDD Scrambling Code | O | | DL Scrambling Code 9.2.2.13 | Scrambling code on which E-AGCH, E-RGCH and E-HICH are transmitted. 0 = Primary scrambling code of the cell 1 . . . 15 = Secondary scrambling code | YES | reject |
| E-AGCH Code FDD Information | O | | 9.2.2.13Ib | | YES | reject |
| E-RGCH/E-HICH Code FDD Information | O | | 9.2.2.13Ia | | YES | reject |
| HSDPA And E-DCH Cell Portions Information | | 0 . . . <maxNoofCellPortions> | | | GLOBAL | reject |
| >Cell Portion ID | M | | 9.2.2.1Ca | | — | |
| >HS-PDSCH And HS-SCCH Scrambling Code | O | | DL Scrambling Code 9.2.2.13 | Scrambling code on which HS-PDSCH and HS-SCCH is transmitted over cell portion. | — | |
| >HS-PDSCH FDD Code Information | O | | 9.2.2.18F | | — | |
| >HS-SCCH FDD Code Information | O | | 9.2.2.18G | | — | |
| >HS-PDSCH, HS-SCCH, E-AGCH, E-RGCH and E-HICH Total Power | O | | Maximum Transmission Power 9.2.1.40 | Maximum transmission power to be allowed for HS-PDSCH, HS-SCCH and E-AGCH, E-RGCH and E-HICH codes over cell portion | — | |
| >E-AGCH And E-RGCH/E-HICH FDD Scrambling Code | O | | DL Scrambling Code 9.2.2.13 | Scrambling code on which E-AGCH, E-RGCH and E-HICH are transmitted over cell portion. | — | |
| >E-AGCH Code FDD Information | O | | 9.2.2.13Ib | | — | |
| >E-RGCH/E-HICH Code FDD Information | O | | 9.2.2.13Ia | | — | |
| >Maximum Target Received Total Wide Band Power | O | | 9.2.2.21a | | YES | ignore |
| >Reference Received Total Wide Band Power | O | | 9.2.2.39B | | YES | ignore |
| Maximum Target Received Total Wide Band Power | O | | 9.2.2.21a | | YES | reject |
| Reference Received Total Wide Band Power | O | | 9.2.2.39B | | YES | ignore |
| Target Non-serving E-DCH to Total E-DCH Power ratio | O | | 9.2.2.21b | | YES | reject |
| HS-DSCH Common System Information | O | | 9.2.2.75 | | YES | reject |
| Common MAC Flows to Delete | O | | 9.2.2.97 | | YES | reject |
| HS-DSCH Paging System Information | O | | 9.2.2.76 | | YES | reject |
| Paging MAC Flows to Delete | O | | 9.2.2.98 | | YES | reject |
| Common E-DCH System Information | O | | 9.2.2.103 | | YES | Reject |

-continued

| IE/Group Name | Presence | Range | IE Type and Reference | Semantics Description | Criticality | Assigned Criticality |
|---|---|---|---|---|---|---|
| Common UL MAC Flows to Delete | O | | Common MAC Flows to Delete 9.2.2.97 | | YES | Reject |
| Common E-DCH MAC-d Flows to Delete | O | | E-DCH MAC Flows to Delete 9.2.1.73 | | YES | Reject |
| Enhanced UE DRX Information | O | | 9.2.2.108 | | YES | reject |

A new IE can be added to indicate the implicit release timer during common E-DCH release. The value may be signaled from the CRNC to the Node B.

An alternative approach is to add the new timer value in the NBAP control plan message. For example, if the new IE is added into the Physical Shared Channel Reconfiguration procedure and into the message PHYSICAL SHARED CHANNEL RECONFIGURATION REQUEST, then when the Node B gets the implicit timer value, it should apply the value for the Enhanced Cell FACH related configuration. In this way, the new implicit timer value is the same for the whole cell. The IE in this example may be defined with a criticality "ignore."

Other examples may add the value in other NBAP messages or introduce the value in a new message.

Below shows the definition of chapter 9.2.2.103 Common E-DCH System Information. The new IE "Common E-DCH Implicit Release Timer" in this example is added to indicate the implicit release timer. The Common E-DCH System Information IE provides information for E-DCH configured for UE in Cell_FACH and Idle state.

| IE/Group Name | Presence | Range | IE Type and Reference | Semantics Description | Criticality | Assigned Criticality |
|---|---|---|---|---|---|---|
| Common E-DCH UL DPCH Information | | 0 . . . 1 | | | — | |
| >UL SIR Target | M | | UL SIR 9.2.1.67A | | — | |
| >DPC Mode | O | | 9.2.2.13C | If received, this IE shall be ignored. DPC mode 0 shall be applied for Common E-DCH(see ref. TS 25.214 [10]). | — | |
| Common E-DCH E-DPCH Information | | 0 . . . 1 | | | — | |
| >Maximum Set of E-DPDCHs | M | | 9.2.2.20C | | — | |
| >Puncture Limit | M | | 9.2.1.50 | | — | |
| >E-TFCS Information | M | | 9.2.2.13Dh | | — | |
| >E-TTI | M | | 9.2.2.13Di | | — | |
| >E-DPCCH Power Offset | M | | 9.2.2.13Dj | | — | |
| >E-RGCH 2-Index-Step Threshold | O | | 9.2.2.13Ig | | — | |
| >E-RGCH 3-Index-Step Threshold | O | | 9.2.2.13Ih | | — | |
| >HARQ Info for E-DCH | M | | 9.2.2.18ba | | — | |
| Common E-DCH Information | | 0 . . . 1 | | | — | |
| >E-DCH Reference Power Offset | O | | 9.2.2.13Y | | — | |
| >E-DCH Power Offset for Scheduling Info | O | | 9.2.1.85 | | — | |
| >Maximum E-DCH resource allocation for CCCH | M | | ENUMERATED (8, 12, 16, 24, 32. 40, 80, 120, . . . , 20) | Interms of TTIs, Value 120 should not be used | — | |
| >Maximum period for collision resolution phase | M | | INTEGER (8 . . . 24, . . .) | Interms of TTIs | — | |
| >Maximum TB Sizes | O | | 9.2.2.106 | | — | |
| >Common E-DCH implicit release indicator | M | | BOOLEAN | TRUE means implicit release is in use. FALSE means implicit release is not in use. | — | |
| >Common E-DCH Additional Transmission Back Off | O | | INTEGER (0 . . . 15, . . .) | | YES | ignore |

-continued

| IE/Group Name | Presence | Range | IE Type and Reference | Semantics Description | Criticality | Assigned Criticality |
|---|---|---|---|---|---|---|
| >Common E-DCH implicit release timer | O | | Common E-DCH Implicit Release Timer | | YES | ignore |
| Common E-DCH HS-DPCCH Information | | 0 . . . 1 | | | — | |
| >ACK-NACK Repetition Factor | M | | 9.2.2.a | | — | |
| >ACK Power Offset | M | | 9.2.2.b | | — | |
| >NACK Power Offset | M | | 9.2.2.23a | | — | |
| >Common E-DCH CQI information | O | | | | — | |
| >>CQI Feedback Cycle k | M | | 9.2.2.21B | | — | |
| >>CQI Repetition Factor | C-CQICyclek | | 9.2.2.4Cb | | — | |
| >>CQI Power Offset | M | | 9.2.2.4Ca | | — | |
| >>Measurement Power Offset | M | | 9.2.2.21C | | — | |
| Common E-DCH Preamble Control Information | | 0 . . . 1 | | | — | |
| >Common Physical Channel ID | M | | 9.2.1.13 | | — | |
| >Common E-DCH Preamble Signature | M | | Preamble Signatures 9.2.2.31 | | — | |
| >Scrambling Code Number | M | | 9.2.2.42 | | — | |
| >Preamble Threshold | M | | 9.2.2.32 | | — | |
| >E-AI Indicator | O | | BOOLEAN | TRUE means E-AIs are in use on the AICH. FALSE means E-AIs are not in use on the AICH. | — | |
| >Common E-DCH AICH Information | | 0 . . . 1 | | | — | |
| >>Common Physical Channel ID | M | | 9.2.1.13 | | — | |
| >>AICH Transmission Timing | M | | 9.2.2.1 | | — | |
| >>FDD DL Channelisation Code Number | M | | 9.2.2.14 | | — | |
| >>AICH Power | M | | 9.2.2.D | | — | |
| >>STTD Indicator | M | | 9.2.2.48 | | — | |
| Common E-DCH F-DPCH Information | | 0 . . . 1 | | | — | |
| >F-DPCH slot format | M | | 9.2.2.93 | | — | |
| >FDD TPC DL Step Size | M | | 9.2.2.16 | | — | |
| >Initial DL Transmission Power | O | | DL Power 9.2.1.21 | Initial power on F-DPCH | YES | ignore |
| >Maximum DL Power | O | | DL Power 9.2.1.21 | Maximum allowed power on F-DPCH | YES | ignore |
| >Minimum DL Power | O | | DL Power 9.2.1.21 | Minimum allowed power on F-DPCH | YES | ignore |
| Common E-DCH E-AGCH Channelisation Code Number | O | | FDD DL Channelisation Code Number 9.2.2.14 | | — | |
| Common E-DCH Resource Combination Information | | 0 . . . <maxnoofCommon EDCHs> | | | — | |
| >Soffset | M | | INTEGER (0 . . . 9, . . .) | | — | |
| >F-DPCH DL Code Number | M | | FDD DL Channelisation Code Number 9.2.2.14 | | — | |
| >UL DPCH Scrambling Code | M | | UL Scrambling Code 9.2.2.59 | | — | |
| >E-RGCH/E-HICH Channelisation Code | M | | FDD DL Channelisation | | — | |

-continued

| IE/Group Name | Presence | Range | IE Type and Reference | Semantics Description | Criticality | Assigned Criticality |
|---|---|---|---|---|---|---|
| >E-RGCH Signature Sequence | O | | Code Number 9.2.2.14 INTEGER (0 ... maxnoofSigSeqE-RGHICH − 1) | | — | |
| >E-HICH Signature Sequence | M | | INTEGER (0 ... maxnoofSigSeqE-RGHICH − 1) | | — | |
| UL Common MAC Flow Specific Information | | 0 ... <maxnoofCommon MACFlows> | | | — | |
| >UL Common MAC Flow ID | M | | Common MAC Flow ID 9.2.2.79 | | — | |
| >Transport Bearer Request Indicator | M | | 9.2.1.62A | | — | |
| >Binding ID | O | | 9.2.1.4 | Shall be ignored if bearer establishment with ALCAP. | — | |
| >Transport Layer Address | O | | 9.2.1.63 | Shall be ignored if bearer establishment with ALCAP. | — | |
| >TNL QoS | O | | 9.2.1.58A | Shall be ignored if bearer establishment with ALCAP. | — | |
| >Payload CRC Presence Indicator | M | | 9.2.1.49 | | — | |
| >Bundling Mode Indicator | O | | 9.2.2.1Bb | | — | |
| >Common E-DCH MAC-d Flow Specific Information | M | | 9.2.2.105 | | — | |
| E-RNTI List Request | O | | NULL | | YES | ignore |

The Common E-DCH Implicit Release Timer can be defined as INTEGER, or as ENUMERATED values as show in the below examples:

| IE/Group Name | Presence | Range | IE Type and Reference |
|---|---|---|---|
| | | | Semantics Description |
| Common E-DCH Implicit Release Timer | | | INTEGER (0 ... 3600) Unit: ms |
| | | | Semantics description |
| Common E-DCH Implicit Release Timer | | | Enumerated (0, 4, 8, 16, 24, 40, 80) In terms of TTIs. |
| Common E-DCH Implicit Release Timer | | | Enumerated (0, 4, 8, 16, 24, 40, 80, infinity) In terms of TTIs. When set to "infinity", implicit common E-DCH resource release is disabled. |
| Common E-DCH Implicit Release Timer | | | ENUMERATED (Zero, More than Zero, ... ) |

Another alternative way is to add the new timer value in the Iub Frame protocol so that CRNC can send the timer to Node B.

One example is to add a new IE in HS-DSCH data frame, which is used together with Enhanced Cell FACH. Another example is to add a new IE to the control frame, for example in High Speed Downlink Shared Channel, HS-DSCH, Capacity Request. A new User Plane frame can also be introduced to carry the information.

Figure 11:
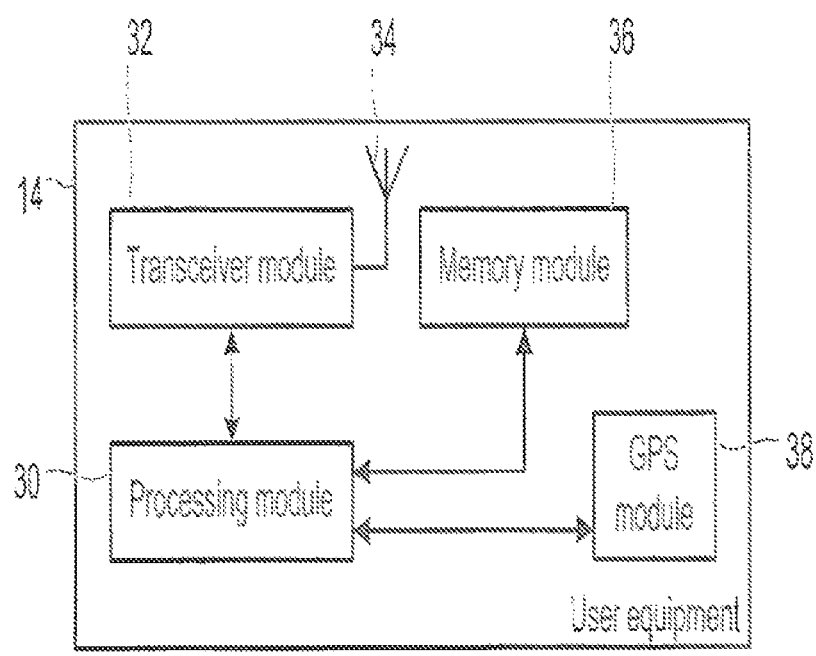
FIG. 11 is a schematic block diagram illustrating an example of a user equipment according to an embodiment.

FIG. 11 shows an example of a user equipment (UE) 14 that can be used in one or more of the non-limiting example embodiments described. The UE 14 comprises a processing module 30 that controls the operation of the UE 14. The processing module 30 is connected to a transceiver module 32 with associated antenna(s) 34 which are used to receive and transmit signals to/from a base station 4, 6 in the network 2. The user equipment 14 also comprises a memory module 36 that is connected to the processing module 30 and that stores program and other information and data required for the operation of the UE 14. In some embodiments, the UE 14 may optionally comprises a satellite positioning system (e.g. GPS) receiver module 38 that can be used to determine the position and speed of movement of the UE 14.

Figure 12:
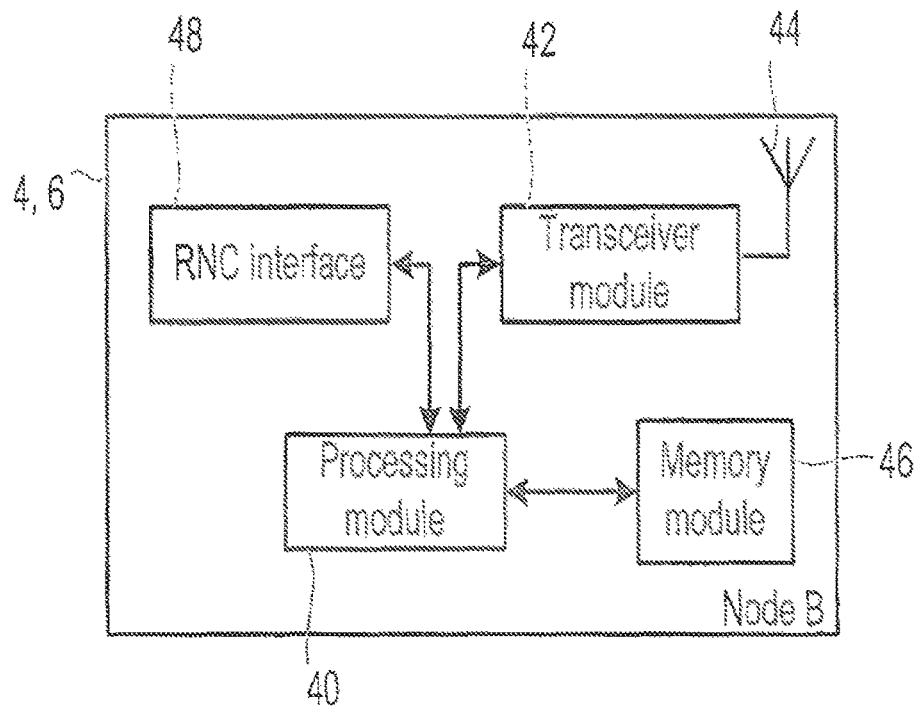
FIG. 12 is a schematic block diagram illustrating an example of a base station, such as a Node B, according to an embodiment.

FIG. 12 shows an example of a base station 4, 6 (called a Node B in UMTS) that can be used in example embodiments described above. The base station 4, 6 comprises a processing module 40 that controls the operation of the base station 4, 6. The processing module 40 is connected to a transceiver module 42 with associated antenna(s) 44 which are used to transmit signals to, and receive signals from, user equipments 14 in the network 2. The base station 4, 6 also comprises a memory module 46 that is connected to the processing module 40 and that stores program and other information and data required for the operation of the base station 4, 6. The base station 4, 6 also includes components and/or circuitry 48, called a RNC interface in FIG. 12, for allowing the base station 4, 6 to exchange information with the RNC 8 (which is typically via the Iub interface) and/or other network node.

Figure 13:
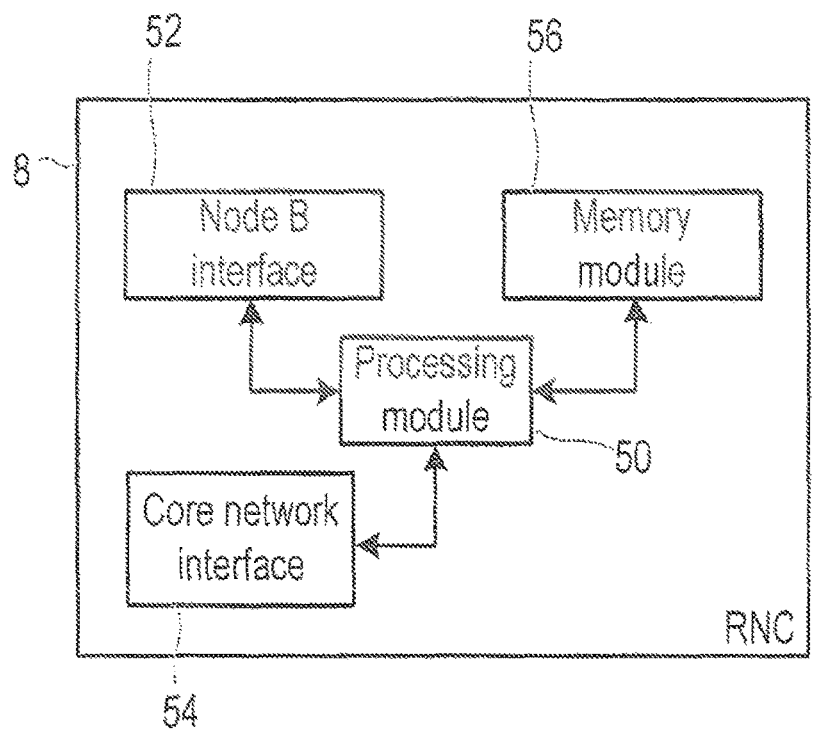
FIG. 13 is a schematic block diagram illustrating an example of a radio network controller according to an embodiment.

FIG. 13 shows an example of a radio network controller (RNC) 8 that can be used in the example embodiments described. The RNC 8 comprises a processing module 50 that controls the operation of the RNC 8. The processing module 50 is connected to components and/or circuitry 52 for allowing the RNC 8 to exchange information with the base stations 4, 6 with which it is associated (which is typically via the Iub interface), and components or circuitry 54 for allowing the RNC 8 to exchange information with the core network 10 (which is typically via the Iu-CS and/or Iu-PS interface). The RNC 8 also comprises a memory module 56 that is connected to the processing module 50 and that stores program and other information and data required for the operation of the RNC 8.

It will be appreciated that not all components of the UE 14, base station B 4, 6, and RNC 8 are illustrated.

The above technology includes multiple advantages. For example, the Node B may release common E-DCH resources to the network as soon as it interprets the piggybacked SI with TEBS=0 as an implicit release. In case of network implementations not aware of this issue, there is no risk that the network would release the common E-DCH resources when the UE sends a piggybacked SI with TEBS=0 before the timer Tb has expired, i.e., without having triggered the implicit release procedure.

Figure 4:
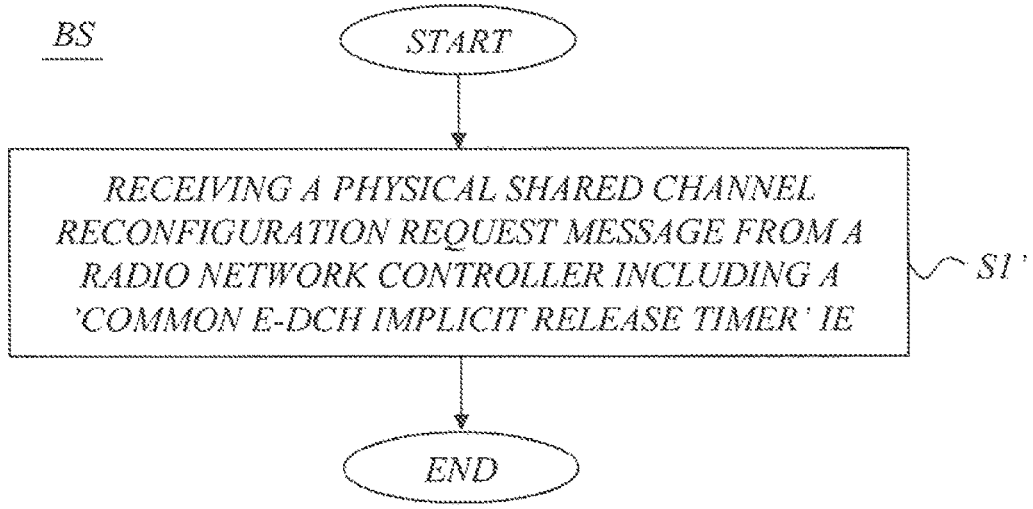
FIG. 4 is a schematic flow diagram illustrating another particular example of a method for supporting release of common radio resources according to an embodiment.

According to a further particular aspect of the proposed technology, there is provided a method and corresponding base station configured for supporting release of common Enhanced Dedicated Channel, E-DCH, resources in a radio communication network. As illustrated in FIG. 4, the base station is receiving in step S1' a PHYSICAL SHARED CHANNEL RECONFIGURATION REQUEST message from a radio network controller including a 'Common E-DCH Implicit Release Timer' information element, IE, that indicates whether a 'E-DCH transmission continuation back off' period is set to zero or to a value different from zero. For example, the 'Common E-DCH Implicit Release Timer' IE is included in a "Common E-DCH Information" IE in a 'Common E-DCH System Information' IE. Reference can also be made to FIGS. 8, 9 and 12.

Figure 7:
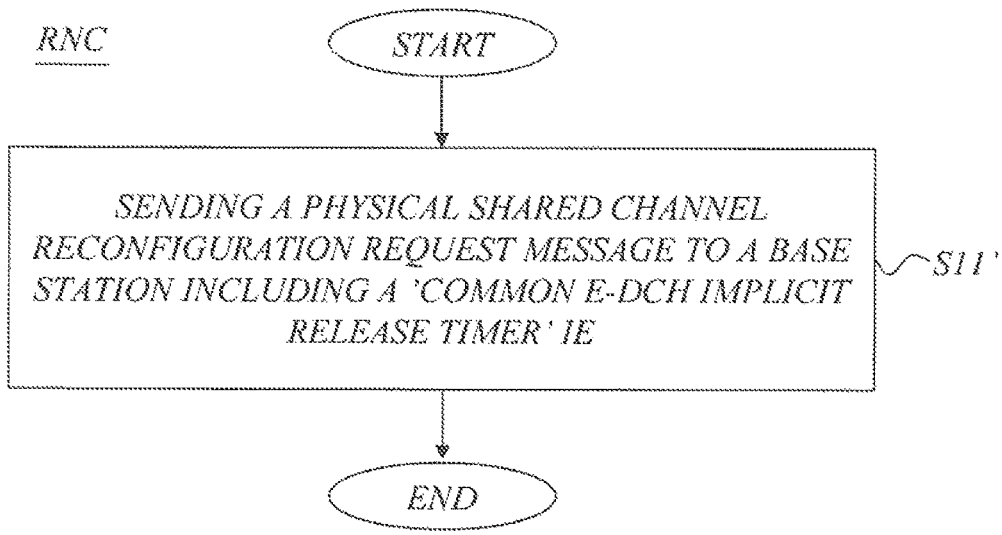
FIG. 7 is a schematic flow diagram illustrating another example of a method performed by a radio network controller for supporting release of common radio resources in a radio communication network according to an embodiment.

According to yet another particular aspect of the proposed technology, there is also provided a method and corresponding radio network controller configured for supporting release of common Enhanced Dedicated Channel, E-DCH, resources in a radio communication network. As illustrated in FIG. 7, the radio network controller is sending in step S11' a PHYSICAL SHARED CHANNEL RECONFIGURATION REQUEST message to a base station including a 'Common E-DCH Implicit Release Timer' information element to indicate whether a 'E-DCH transmission continuation back off' period is set to zero or to a value different from zero. For example, the 'Common E-DCH Implicit Release Timer' IE is included in a "Common E-DCH Information" IE in a 'Common E-DCH System Information' IE. Reference can also be made to FIGS. 8, 9 and 13.

The present technology is applicable to all relevant releases of the applicable standards, including at least the 3GPP TS 25.433 standard Release 8 to Release 11 and onwards.

Abbreviations
3GPP 3rd Generation Partnership Project
CCCH Common Control Channel
BS Base Station
CN Core Network
DCCH Dedicated Control Channel
DCH Dedicated Channel
DTCH Dedicated Traffic Channel
E-DCH Enhanced Dedicated Channel
E-AGCH E-DCH Absolute Grant Channel
FACH Forward Access Channel
HARQ Hybrid Automatic Repeat Request
HSPA High Speed Packet Access
L1 Layer 1 (physical layer)
MAC Medium Access Control
AM Acknowledged Mode
PDU Protocol Data Unit
RACH Random Access Channel
RLC Radio Link Control
RNC Radio Network Controller
RRC Radio Resource Control Protocol
SDU Service Data Unit
SI Scheduling Information
SIB System Information Block
TEBS Total E-DCH Buffer Status
UE User Equipment
FDD Frequency Division Duplexing
TTI Transmission Time Interval
UMTS Universal Mobile Telecommunications System
UTRA UMTS Terrestrial Radio Access
UTRAN UMTS Terrestrial Radio Access Network REFERENCES INCORPORATED BY REFERENCE (RELEVANT PARTS REFERRED TO IN THE PRESENT SPECIFICATION)

[1] 3GPP TS 25.321 v8.15.0, "Medium Access Control (MAC) protocol specification"
[2] 3GPP TS 25.331 v8.19.0. "Radio Resource Control (RRC); Protocol specification"
[3] 3GPP TS 25.433 v8.12.0 "UTRAN Iub interface Node B Application Part (NBAP) signalling"

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in a UTRAN context, the principles of the technology described may also be applied to other radio access technologies.

Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

What is claimed is:

1. A method performed by a base station for supporting release of common radio resources in a radio communication network, said method comprising the steps of:
    receiving an indication of a value of a timer for implicit release of common radio resources from a radio network controller; and
    determining whether to release the common radio resources based on said indication of the value of said timer for implicit release of common radio resources;
    wherein said indication is received in a PHYSICAL SHARED CHANNEL RECONFIGURATION REQUEST message.

2. The method of claim 1, wherein said indication is included in a "Common E-DCH Implicit Release Timer" information element (IE) in said PHYSICAL SHARED CHANNEL RECONFIGURATION REQUEST message.

3. The method of claim 2, wherein said indication in the "Common E-DCH Implicit Release Timer" IE is defined to be of ENUMERATED type with values zero or more than zero.

4. A method performed by a radio network controller for supporting release of common radio resources in a radio communication network, said method comprising the step of:
    said radio network controller sending an indication of a value of a timer for implicit release of common radio resources to a base station, to thereby enable the base station to determine whether to release the common radio resources based on said indication;
    wherein said method comprises the step of said radio network controller adding an information element (IE) including said indication to a message, and wherein said step of said radio network controller sending said indication comprises the step of said radio network controller sending said message with said added IE to said base station.

5. The method of claim 4, wherein said message is PHYSICAL SHARED CHANNEL RECONFIGURATION REQUEST message.

6. The method of claim 5, wherein said indication is included in a "Common E-DCH Implicit Release Timer" information element (IE) in said PHYSICAL SHARED CHANNEL RECONFIGURATION REQUEST message.

7. The method of claim 6, wherein said indication in the "Common E-DCH Implicit Release Timer" IE is defined to be of ENUMERATED type with values zero or more than zero.

8. A base station for a radio communication network, wherein said base station comprises:
    an interface configured to receive an indication of a value of a timer for implicit release of common radio resources from a radio network controller; and
    a processing module configured to determine whether to release common radio resources based on said indication;
    wherein said indication indicates a value of a timer for implicit release of common Enhanced Dedicated Channel (E-DCH) resources, and said processing module is configured to determine whether to release common E-DCH resources responsive to the indication; and
    wherein said interface is configured to receive said indication in a "Common E-DCH Implicit Release Timer" information element (IE) in a PHYSICAL SHARED CHANNEL RECONFIGURATION REQUEST message.

9. A radio network controller for a radio communication network, wherein said radio network controller comprises an interface configured to send an indication of a value of a timer for implicit release of common radio resources to a base station, to thereby enable the base station to determine whether to release common radio resources based on said indication and wherein said radio network controller comprises a processing module configured to add an information element (IE) including said indication in a message, and wherein said interface is configured to send said message to the base station.

10. The radio network controller of claim 9, wherein said radio network controller comprises a processing module configured to include said indication in a "Common E-DCH Implicit Release Timer" information element (IE) in a PHYSICAL SHARED CHANNEL RECONFIGURATION REQUEST message, and said interface is configured to send said PHYSICAL SHARED CHANNEL RECONFIGURATION REQUEST message to the base station.

* * * * *

UNITED STATES PATENT AND TRADEMARK OFFICE
CERTIFICATE OF CORRECTION

PATENT NO. : 10,375,599 B2
APPLICATION NO. : 15/422144
DATED : August 6, 2019
INVENTOR(S) : Pradas et al.

Page 1 of 1

It is certified that error appears in the above-identified patent and that said Letters Patent is hereby corrected as shown below:

In the Specification

In Column 1, Line 7, delete "2013," and insert -- 2013, now Pat. No. 9,596,714, --, therefor.

In Column 2, Line 35, delete "second aspect" and insert -- second aspect, --, therefor.

In Column 9, Line 52, delete "tinter" and insert -- timer --, therefor.

Signed and Sealed this
Twenty-fourth Day of December, 2019

Andrei Iancu
*Director of the United States Patent and Trademark Office*